Aug. 17, 1954

T. A. McCARRAN 2,686,700

JOINT FOR CONNECTING SINK TOPS

Filed April 16, 1953

INVENTOR.
THOMAS A. McCARRAN
BY
James E. Toomey
ATTORNEY

Aug. 17, 1954   T. A. McCARRAN   2,686,700
JOINT FOR CONNECTING SINK TOPS
Filed April 16, 1953   2 Sheets-Sheet 2
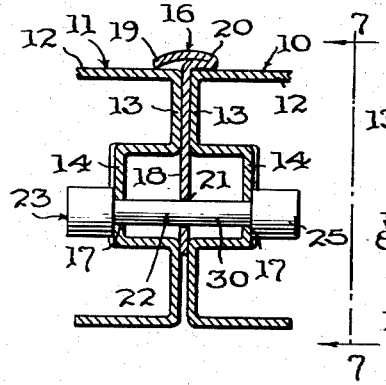
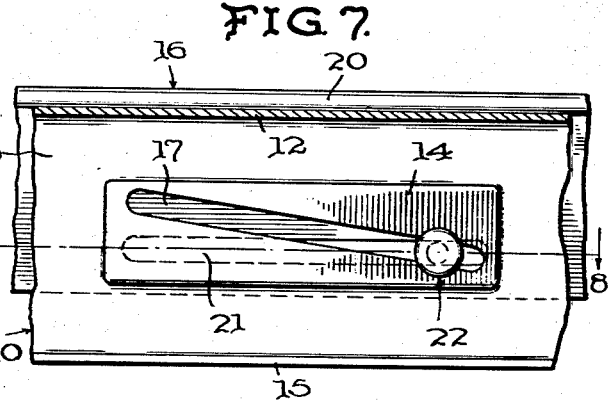
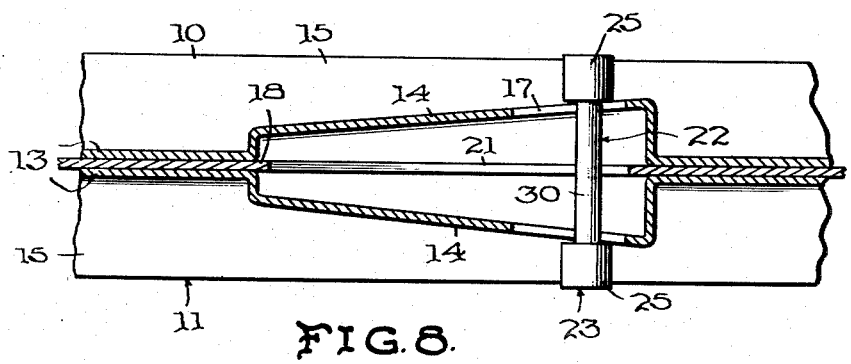
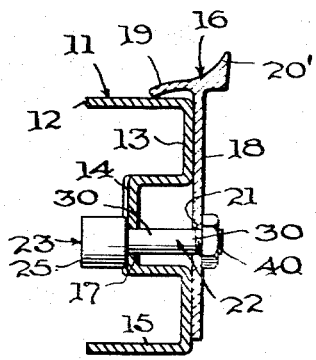
INVENTOR.
THOMAS A. McCARRAN
BY James E. Tooney
ATTORNEY Patented Aug. 17, 1954

2,686,700

UNITED STATES PATENT OFFICE 2,686,700

JOINT FOR CONNECTING SINK TOPS

Thomas A. McCarran, Neshaminy, Pa., assignor to Kaiser Metal Products, Inc., Oakland, Calif., a corporation of California Application April 16, 1953, Serial No. 349,276

14 Claims. (Cl. 311—4)

This invention relates to joint arrangements. More particularly, it is concerned with providing a novel arrangement including novel means for drawing together adjacent metal sink sections and the like to form a tight joint therebetween.

In the past, considerable difficulty has been experienced in obtaining a tight joint between adjacent metal sink sections. As a result, openings or crevices existed between the sections with the result that food particles and other debris would frequently fall or be brushed into the crevices during the cleaning of the sink surfaces. Consequently, in addition to being a source of annoyance, it was difficult to dislodge these food particles from the crevices except with special tools and even then, all of the food particles could not be removed, with the result that it was difficult to keep the surfaces of the sink cabinets completely clean. The acids in the food particles also sometimes caused corrosion and deterioration of the walls of the sink cabinets defining the crevices.

Various devices such as molding strips and other fittings have been proposed for use in sealing off these openings between adjacent sink sections and for drawing the sections close together. However, these have not always been satisfactory for one or more reasons, either because they were usually made of complex parts and fittings which could not always be conveniently used in close or cramped quarters, or they required the use of special tools for emplacement or else they were too expensive to manufacture in quantity. Others of these molding strips and fittings never truly performed the job of tightly securing two adjacent such sections together.

Accordingly, it is an object of this invention to provide a novel joint arrangement wherein two adjacent sink sections or the like are securely and tightly connected together.

It is another object of this invention to provide a novel arrangement for joining two adjacent sink sections or the like together wherein a T-shaped molding strip is used.

It is another object of this invention to provide novel means for drawing a sink section or the like tightly against a molding strip.

It is a further object of this invention to provide a novel arrangement for securely and tightly connecting two adjacent sink sections and the like while using a T-shaped molding strip, wherein novel means are used for drawing the wings of the T-shaped strip into tight engagement with the top surfaces of the sink sections at the same time that the sink sections are also drawn tightly together about the stem of the T-shaped molding strip.

It is another object of this invention to provide a novel joint arrangement between two adjacent sink sections or the like which can be utilized without the need of special tools or complex fittings.

It is another object of this invention to provide a novel joint arrangement between two adjacent sink sections wherein any exposed opening between the several sections is effectively eliminated.

These and other objects are accomplished by a joint construction wherein when two adjacent sink sections are joined together, a T-shaped molding strip is inserted between two adjacent sink sections. This T-shaped molding strip is provided with a stem having an uninclined elongated slot and oppositely projecting wings. The downturned walls of the sink sections are arranged closely adjacent the stem of the molding strip and the downturned wall on at least one sink section is provided with a wedge shaped element on the inner surface thereof. This wedge shaped element and the wall of the other sink section in turn are provided with an elongated inclined slot or opening. A pin member provided with shoulder elements or the like at each extremity thereof is insertable within and at one end of the slots in the walls of the sink sections and the T-shaped molding strip in such a way that one of the shoulders on the pin member is engageable with the wedge shaped element on the one sink section, whereby when the pin member is moved toward the opposite ends of the several slots, the stem of the molding strip will be forced downwardly until the wing elements thereof engage the top surfaces of the sink sections as the walls of the sink sections are simultaneously drawn together about the stem of the T-shaped molding strip.

Other objects and advantages of the instant invention will become more apparent from a review of the following detailed description when taken in conjunction with the appended drawings, wherein:

Figure 6 is a cross-sectional view of two adjacent sink elements drawn tightly together to form a completed joint;

Figure 7 is a side elevational view taken along lines 7—7 of Figure 6;

Figure 8 is a sectional view of the joint of Figure 7 when taken along lines 8—8 thereof; and Figure 9 is a cross-section of a joint involving only one sink section or the like and a molding strip.

Figure 1:
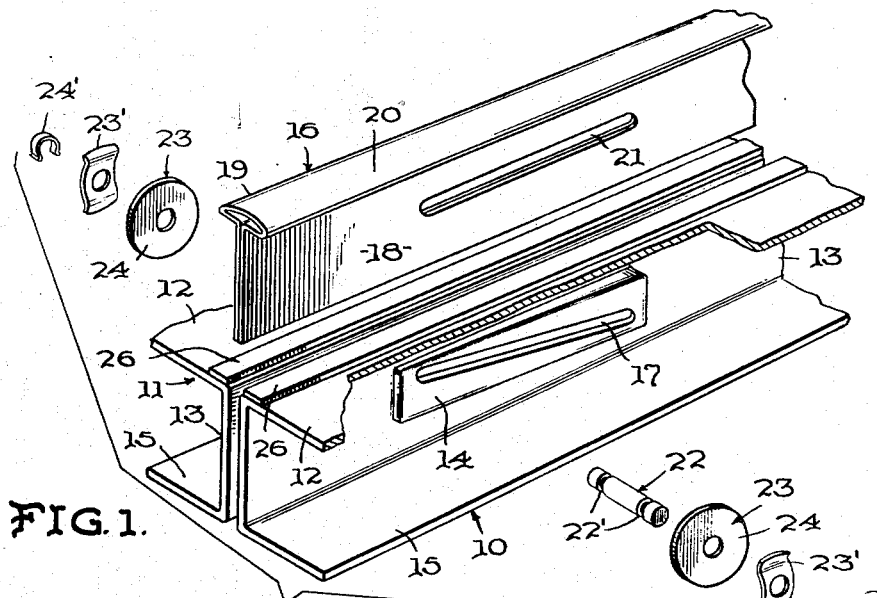
Figure 1 is an exploded, perspective and fragmentary view of the several elements making up the novel joint arrangement of the instant invention.

With further reference to the drawings and particularly Figure 1, the two sink sections 10 and 11 are each provided with a top surface portion 12 from which a wall 13 projects in a downward direction.

Although in the preferred embodiment of the invention it is contemplated that each wall 13 on a sink section be provided with an elongated wedge shaped element which may be in the form of an embossment 14 on the inner surface thereof, a satisfactory joint will be had if the wall 13 on only one sink section is provided with such an embossment. This embossment is also provided with an elongated inclined opening or slot 17.

In some instances, each of the sink sections 10 and 11 will also be provided with a reinforcing flanged portion 15 adjacent wall 13 which extends in a direction parallel to the top surface 12 thereof.

A T-shaped molding or trim strip 16 is adapted to be inserted between the two adjacent sink sections in such a way that the stem 18 of the T-shaped strip will be located directly between and parallel to the walls 13 of the sink sections while the oppositely projecting wings 19 and 20 of the molding strip 16 are adapted to overlie the top surfaces of the sink sections.

This T-shaped strip 16 may be made in various ways. For example, it may be roll formed from a strip of sheet metal, or it may be conveniently made in the form of an extrusion. The stem 18 of the T-shaped strip is advantageously provided with an uninclined, elongated slot 21, which extends in a direction parallel to and in suitable spaced relationship to the wings of the T-shaped member 16.

A suitable pin member or element 22, provided with a wall wedge engaging element 23 at opposite extremities thereof which may be in the form of a washer 24 as indicated in Figure 1, being held on the pin 22 by means of the horseshoe locking clip 24' and spring washer 23' with clip 24' being receivable in the annular recess 22' in the pin member, or shoulder element 25, as indicated in Figures 2–9, is adapted to be inserted in the several slots or openings 17 in the walls 13 and the slot 21 in the stem 18 of the T-shaped molding strip 16 at one end thereof. Thus, when the pin member is then moved to the opposite ends of the several slots, the walls 13 of the sink sections will be drawn tightly against the stem 18 of the T-shaped strip simultaneously with the wings 19 and 20 of the T-shaped member being drawn tightly against the top surfaces 12 of the sink sections.

Figures 2, 3:
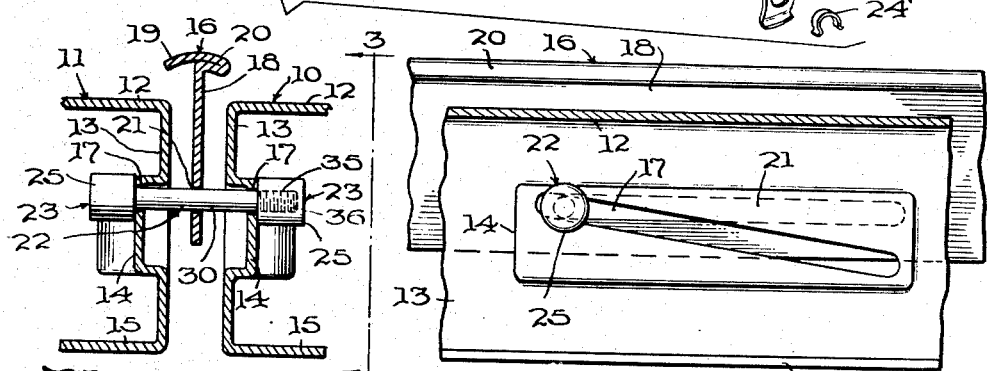
Figure 2 is a cross sectional view of the two adjacent sink elements making up the instant invention prior to their being joined together.
Figure 3 is a side elevational view taken along lines 3—3 of Figure 2.
Figures 4, 5:
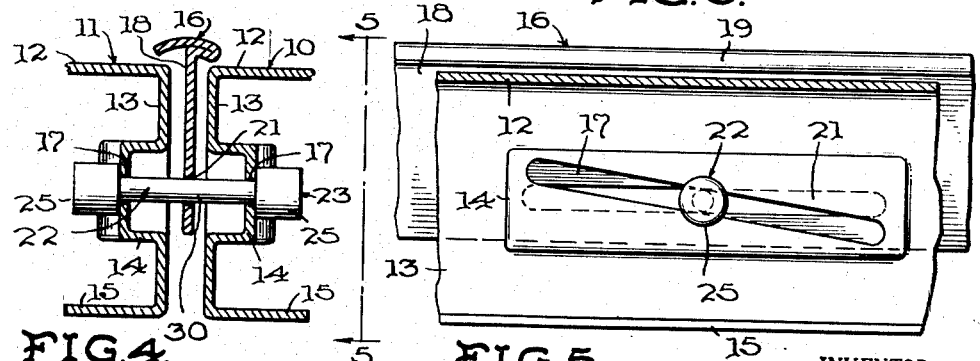
Figure 4 is another sectional view of two adjacent sink elements making up the instant invention prior to their being joined together, and during the time the pin member is being moved along the slots in the several elements.
Figure 5 is a side elevational view taken along lines 5—5 of Figure 4.

If desired, gaskets 26 made from strips of resilient material may also be sandwiched in between the wings of the T-shaped strip and the top surface of sink section.

Where the pin 22 is provided with shoulder elements 25, the pin may be so formed that it is provided with a shank portion 30 and one shoulder element which is formed integrally therewith. The opposite end of the shank portion 30 would then be provided with a threaded portion 35 to which the apertured threaded portion 36 of the other shoulder element is adapted to be screwed as indicated in Figure 2.

In an advantageous embodiment of the invention, it is contemplated that the novel means of the instant invention can also be used for fastening a sink section 11 to a corner molding strip 16 of the type to be found at the ends of sink sections, where they abut a wall surface. In this case, the pin member 22 may be provided with a nut 40 which serves as one of the shoulder elements and the wing 20' of the T-shaped molding strip would also be turned upwardly as well as outwardly to make a smooth joint between the wall and the sink section.

It will be obvious from the above discussion that a novel and efficient joint is herein provided between adjacent sink sections or between one sink section and a molding strip. This joint arrangement can also be used on metal cabinets and other products besides sink sections, whether they be made of ferrous or non-ferrous metals, porcelain, plastics, or wood, etc. Accordingly, the term "sink section" or "member" as used in the appended claims is to be construed as being generic to sink sections, wall cabinets, as well as other products.

In addition, the pin 22 may also be used not only as a fixed component of the finished joint, but also as a compressive tool or jig for holding the several members making up the joint securely together while they are permanently riveted or welded to one another. Thereafter the pin can be removed.

It is obvious that various changes and modifications may be made in the invention without departing from the spirit and scope thereof as defined by the appended claims.

I claim:

1. Means for fastening together adjacent sink members and the like comprising the combination of a pair of sink sections, each of said sections being provided with a top surface portion and a downwardly projecting wall, a wedge shaped element located on the inner surface of one of said downwardly projecting walls, said wedge shaped element and the wall of said other sink section each being provided with an inclined elongated slot, a molding strip interposed between the downwardly projecting walls of said sink sections, said molding strip including a stem insertable directly between said downwardly projecting walls, said stem being provided with an elongated uninclined slot and a wing element located at one extremity of the stem and projecting outwardly therefrom at a transverse angle and adapted to overlie the top surface portion of a sink section, and a pin member insertable within and at one end of the slots in the said stem and downwardly projecting walls upon the alignment of all of said slots with each other, and wall wedge engaging means on said pin member, whereby when said pin member is moved toward the other ends of said slots, the downwardly projecting walls of the sink sections will be drawn up tightly against the stem of the molding strip, while the wing of the molding strip is brought into tight surface contact with the top surface of a sink section.

2. The combination claimed in claim 1 wherein said wedge shaped element on a wall of said sink section comprises an embossment on the inner surface of the wall.

3. Means for fastening together adjacent sink members and the like comprising the combination of a pair of sink sections, each of said sections being provided with a top surface portion and a downwardly projecting wall, a wedge shaped element located on the inner surfaces of both of said downwardly projecting walls, each of said wedge shaped elements also being provided with an inclined elongated slot, a molding strip interposed between the downwardly projecting walls of said sink sections, said molding strip including a stem provided with an elongated uninclined slot and a wing element located at one extremity thereof and projecting outwardly therefrom at a transverse angle and adapted to overlie the top surface portion of one of the said sink sections, and a pin member provided with a wall wedge engaging portion insertable within and at one end of the slots in the said stem and the downwardly projecting walls upon the alignment of all of the said slots with each other, whereby when said pin member is moved toward the other ends of said slots, with the wall wedge engaging portion of the pin member being in engagement with at least one of the said wedge shaped elements on the walls of the sink sections, the downwardly projecting walls of the sink section will be drawn tightly together against the stem of the molding strip, while the wing element of the molding strip is brought into tight surface contact with the top surface of a sink section.

4. The combination defined in claim 3, wherein said wall wedge engaging portion on the pin member is in the form of a shoulder element.

5. The combination defined in claim 3, wherein said wall wedge engaging portion on the pin member is in the form of a washer.

6. The combination claimed in claim 3, wherein each wedge shaped element comprises an embossment on the inner surface of the downturned wall of a sink section.

7. Means for fastening together adjacent sink members and the like comprising the combination of a pair of sink sections, each of said sections being provided with a top surface portion and a downwardly projecting wall, a wedge shaped embossment located on the inner surface of one of said downwardly projecting walls, said embossment also being provided with an inclined elongated slot, a T-shaped molding strip interposed between the downwardly projecting walls of said sink sections, with the stem portion of the T-shaped strip being insertable directly between said downwardly projecting walls, said stem portion also having an uninclined elongated slot, and the wing elements of the T-shaped strip being adapted to overlie the top surface portions of said sink sections, and a shouldered pin member insertable within and at one end of the slots in the said stem portion and said downwardly projecting walls, upon the alignment of all of said slots with each other, whereby when said pin member is moved toward the other ends of said slots, the downwardly projecting walls of the sink sections will be drawn up tightly against the stem portion of the T-shaped strip as the wing elements of the T-shaped strip are brought into tight surface contact with the top surfaces of the said sink sections.

8. A joint construction of the type described comprising the combination of a molding strip provided with a stem and a wing element projecting away from the stem at one extremity of the stem, said stem also being provided with an elongated uninclined slot, a sink section located on each side of said stem, each sink section having a top surface portion and a wall projecting downwardly therefrom, with the wall being located in parallel relationship to said stem on the molding strip, said wall also being provided with an inclined elongated slot, and one of said walls also being provided with a wedge shaped element located on the inner surface thereof, said wedge shaped element having an inclined elongated slot therein and a shouldered pin member insertable within and at one end of the slots in said stem, and said downwardly projecting walls upon the alignment of all of the said slots with each other, whereby when said pin member is moved toward the other ends of said slots, the downwardly projecting walls of the sink sections will be drawn tightly against the stem of the molding strip while the wing element of the molding strip is brought into tight surface contact with the top surface of a sink section.

9. A joint construction of the type described in claim 8 wherein the said wedge shaped element comprises an embossment formed integrally with the downturned wall on a sink section.

10. A joint construction of the type described comprising the combination of a molding strip provided with a stem having an uninclined elongated slot and a wing element projecting away from the stem at one extremity thereof, an opposing sink section located on either side of the stem of said molding strip, each of said sections being provided with a top surface portion and a downturned wall, with said wall in turn having a wedge shaped embossment on the inner surface thereof and an elongated inclined slot located in the said embossment and means for drawing the walls and the top surface portion of said sink sections tightly against said molding strip, said means including a pin member having spaced shoulders thereon and insertable within and at one end of the slots in the said walls and the said stem upon the alignment of all of the said slots with each other, whereby when said pin member is moved toward the other end of the slots, the stem of the molding strip will be forced downwardly until the wing element thereon engages the top surface of a sink section as the walls of the sink sections are simultaneously drawn up tightly against the sides of the stem.

11. A joint construction of the type described comprising the combination of a T-shaped molding strip having a stem provided with an uninclined elongated slot and wing elements projecting away from the stem at one extremity thereof, a sink section located on either side of the stem of said molding strip, each of said sections being provided with a top surface portion and a downturned wall, with said wall in turn having a wedge shaped embossment on the inner surface thereof and an elongated inclined slot located in the said embossment and means for drawing the walls and the top surface portions of said sink sections tightly against the T-shaped molding strip, said means including a pin member having spaced shoulders thereon and insertable within and at one end of the slots in the said walls and the said stem upon the alignment of the said slots with each other, whereby when said pin member is moved toward the opposite end of the slots, the stem of the molding strip will be forced downwardly until the wing elements thereof engage the top surfaces of the sink sections as the walls of the sink sections are simultaneously drawn up tightly against the sides of the stem.

12. A joint construction of the type described comprising the combination of a molding strip having a stem provided with an uninclined elongated slot and a wing element projecting away from the stem at one extremity thereof, a sink section located on one side of the stem of said molding strip, said section being provided with a top surface portion and a downturned wall, with said wall having a wedge shaped element located on the inner surface thereof and an elongated inclined slot located in the said wedge shaped element, and means including a pin having a wall wedge engaging portion insertable within the slots in the said stem and downturned wall for drawing the wall and the top surface portion of said sink section tightly against the molding strip.

13. The joint construction of the type described in claim 12, wherein the wedge shaped element located on the inner surface of the downturned wall is in the form of an embossment on the wall.

14. A joint construction of the type described comprising the combination of a T-shaped molding strip having a stem provided with an uninclined elongated slot and a wing element projecting away from the stem at one extremity thereof, a sink section located on one side of the said stem, said section being provided with a top surface portion and a downturned wall, a wedge shaped embossment on the inner surface of the said wall, said embossment having an inclined elongated slot, and a pin having a shoulder portion at one extremity thereof inserted within and at one end of the slots in the stem and the downturned wall upon the alignment thereof, with the said shoulder portion being adapted to engage the wedge shaped embossment on the downturned wall, whereby when said pin is moved toward the opposite end of the slots, the stem of the molding strip will be forced downwardly until the wing element of the strip engages the top surface of the sink section as the wall of the section is simultaneously drawn up tightly against the said stem.

References Cited in the file of this patent

UNITED STATES PATENTS

| Number | Name | Date |
|---|---|---|
| 1,786,497 | Krick et al. | Dec. 30, 1930 |
| 1,893,481 | Adams | Jan. 10, 1933 |
| 2,101,344 | Reynolds | Dec. 7, 1937 |
| 2,104,550 | Bates | Jan. 4, 1938 |
| 2,166,196 | Rosenberg | July 18, 1939 |
| 2,327,585 | Ulrich | Aug. 24, 1943 |
| 2,484,283 | Gilbert et al. | Oct. 11, 1949 |
| 2,582,816 | Bonnell | Jan. 15, 1952 |